H. ADLER.
Domestic Boiler.
No. 69,890.
Patented Oct. 15, 1867.
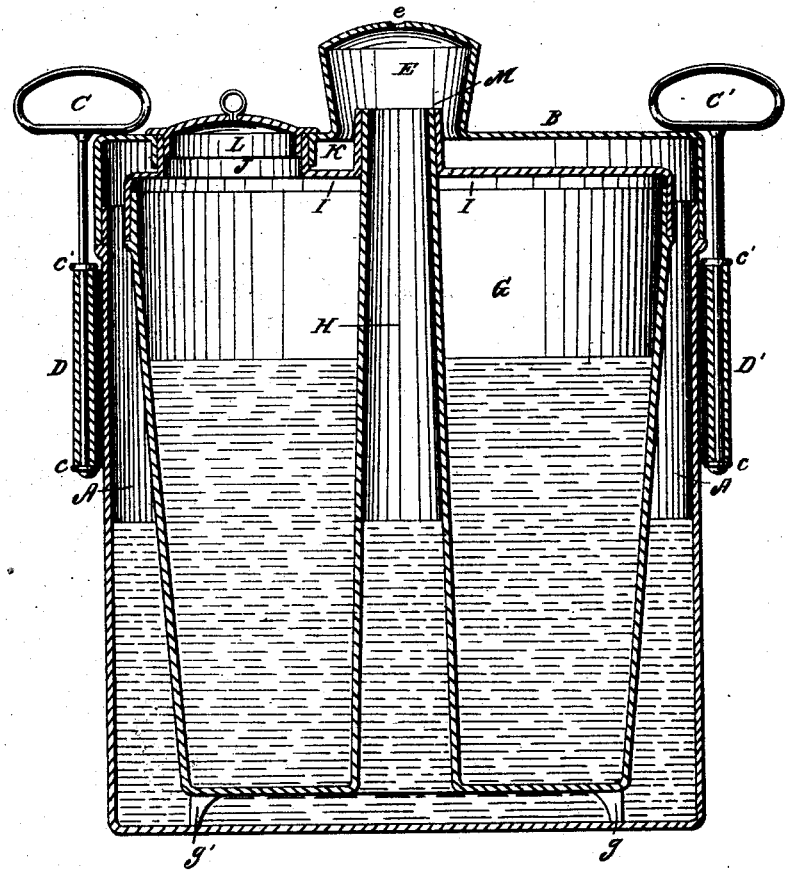
Witnesses:
James H. Layman
Samuel Knight
Inventor:
Henry Adler
By Knight Bros.
attys.

United States Patent Office.

HENRY ADLER, OF YELLOW SPRINGS, OHIO.

Letters Patent No. 69,890, dated October 15, 1867.

IMPROVEMENT IN BOILERS.

*The Schedule referred to in these Letters Patent and making part of the same.*

TO WHOM IT MAY CONCERN:

Be it known that I, HENRY ADLER, of Yellow Springs, Greene county, Ohio, have invented a new and useful Cooking-Vessel; and I hereby declare the following to be a full, clear, and exact description thereof, reference being had to the accompanying drawing, making part of this specification.

This invention relates to an apparatus for cooking soups, broths, and other delicate viands, the apparatus being arranged in such a manner as to subject the contents of the cooking-vessel to a slight pressure, which is obtained by the steam which generates in the apparatus in the act of cooking, and so as to wholly avoid the danger of scorching or burning.

The accompanying drawing is an axial section of a cooking-vessel embodying my improvements.

The external cylinder or case A, used as a hot-water jacket, is provided with a removable lid, B, which is held securely in position against the pressure of steam by means of the loops or handles C C'. These handles are adapted to turn freely within the ears D D', which project from the side of the jacket A, and they are prevented from becoming detached from said ears by the collars $c$ $c'$. The lid B is provided with a small steam-chamber, E, having a slight ventage, $e$, for the escape of steam, this ventage being large enough to prevent any dangerous accumulation of steam, and at the same time small enough to insure a sufficient pressure for the purpose desired. The broth, soup, or other viand to be cooked is placed within an inner vessel or chamber, G, (which I term the digester,) somewhat smaller than the other one, and furnished with a central hot-water and steam-duct, H, and is elevated a short distance above the bottom of the jacket A by means of the feet $g$ $g'$. The cap I of this digester has a neck, J, which fits closely within a collar, K, of the other lid, B, and this neck is provided with a tightly-fitting stopper, L, and another neck, M, on the same cap I embraces the upper end of the steam-duct H. A sufficient space is left between the neck M and the interior of the steam-chamber E to allow a free circulation of steam around the top of the digester. The handles C $c$ C' $c'$ serve the several purposes of fastening down the outer cover, and of affording a means of lifting either the entire apparatus or the outer vessel. The outer vessel may be used separately when desired. A very perfect form of my digester might have the interior of the digester enamelled. The lids B and I are first removed from their respective vessels, and the soup or other article to be cooked is poured into the digester G, after which the jacket A is filled with a sufficient quantity of water, and the two lids are then placed in their proper position, the outer one being secured by the rotating handles C C'. The vessel is then placed over the fire, and the contents of the digester are thoroughly cooked by means of the hot water and steam with which it is completely enveloped; and as the cooking takes place within a closed vessel, and also under a slight pressure, there is no chance for any of the aromatic properties of the substances to escape into the air with the steam which would be continually ascending from an open vessel. And while the heat due to the confinement and pressure becomes very effective for elaborating the edible qualities, it can never be so excessive as to cause burning or scorching, because it cannot exceed that of the watery envelope.

I claim herein as new, and of my invention—

1. The arrangement substantially as described of the hot-water jacket A B K, steam-chamber E $e$, digester G H I M, and stopper L, as and for the purpose specified.

2. In combination with the elements of the preceding clause, I claim the rotatable loops C $c$ C' $c'$, serving the double purpose of handles and of catches.

In testimony of which invention I hereunto set my hand.

HENRY ADLER.

Witnesses:
 GEO. H. KNIGHT,
 JAMES H. LAYMAN.